(12) United States Patent
Bates et al.

(10) Patent No.: US 8,493,399 B1
(45) Date of Patent: Jul. 23, 2013

(54) MULTIPROCESS GPU RENDERING MODEL

(75) Inventors: John Paul Bates, Redwood City, CA (US); Nathaniel Duca, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/347,528

(22) Filed: Jan. 10, 2012

(51) Int. Cl.
*G09G 5/36* (2006.01)
*G06T 1/20* (2006.01)
*G06T 1/60* (2006.01)

(52) U.S. Cl.
USPC .......................... 345/558; 345/506; 345/530

(58) Field of Classification Search
USPC .......................... 345/501, 502, 506, 530, 558
See application file for complete search history.

(56) References Cited

U.S. PATENT DOCUMENTS

| | | | | |
|---|---|---|---|---|
| 5,673,416 A | * | 9/1997 | Chee et al. | 345/535 |
| 5,798,770 A | * | 8/1998 | Baldwin | 345/506 |
| 5,953,020 A | * | 9/1999 | Wang et al. | 345/558 |
| 5,995,080 A | * | 11/1999 | Biro et al. | 345/603 |
| 2006/0146057 A1 | * | 7/2006 | Blythe | 345/506 |

* cited by examiner

*Primary Examiner* — Joni Richer
(74) *Attorney, Agent, or Firm* — Sterne, Kessler, Goldstein & Fox P.L.L.C.

(57) ABSTRACT

Methods, systems, and apparatuses, including computer programs encoded on a computer storage medium, for rendering application content are disclosed. In one embodiment a content receiver receives application content for rendering on a display unit of a computing device. A first processing unit renders the application content onto a first frame of a plurality of frames, and a second processing unit sequentially renders the plurality of frames onto the display unit. A counter counts of a number of outstanding frames as provided by the first processing unit to the second processing unit relative to corresponding acknowledgement messages indicating that one of the outstanding frames has been rendered onto the display unit. If the count is less than a threshold, the first processing unit renders the application content onto the first frame, otherwise the first processing unit waits to render the application content until the count is less than the threshold.

22 Claims, 4 Drawing Sheets

MULTIPROCESS GPU RENDERING MODEL

BACKGROUND

In modern day computing systems, rendering content onto a screen of a computer or other device may be done using one or more processes. In a single processing environment, a rendering process renders a frame of data from an application onto a buffer, and a graphics processing unit (GPU) renders the buffered data onto a screen of a device. This process then repeats in a continuous loop, in which the rendering process is blocked from performing any additional functions until the GPU calls for the frame stored in the buffer.

In a multi-processing system, the interaction between the rendering process and the GPU also works in a continuous loop, except that the rendering process will continue to generate frames and store them in the buffer at a rate faster than the GPU can render the frames for display, until the buffer is full. When the buffer is full, the rendering process will then be blocked, and will wait until the buffer is empty to begin generating new frames of data.

Blocking the rendering process while waiting for the GPU wastes valuable processing resources on a computing device, in both single-processing and multi-processing systems. Allowing the rendering process to continually process contents until the buffer is full, often results in a choppy image or animation on the screen, because the rendering process will wait or be blocked from resuming additional frame processing until the buffer is empty.

BRIEF SUMMARY

In general, one embodiment of the subject matter described in this specification may be embodied in a system in which a content receiver receives application content for rendering on a display unit of a computing device, a first processing unit renders the application content onto a first frame of a plurality of frames, and a second processing unit sequentially renders the plurality of frames onto the display unit. A counter of the system includes a count of a number of outstanding frames as provided by the first processing unit to the second processing unit, and a workflow engine determines when the first processing unit renders the visual content onto the first frame based on the counter.

Other embodiments may include corresponding methods, apparatus, and computer programs, configured to perform the actions of the methods, encoded on computer storage devices. Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments are described herein with reference to illustrations for particular applications. It should be understood that the embodiments are not intended to be limiting. Those skilled in the art with access to the teachings provided herein will recognize additional modifications, applications, and embodiments within the scope thereof and additional fields in which the embodiments would be of significant utility.

Figure 1:
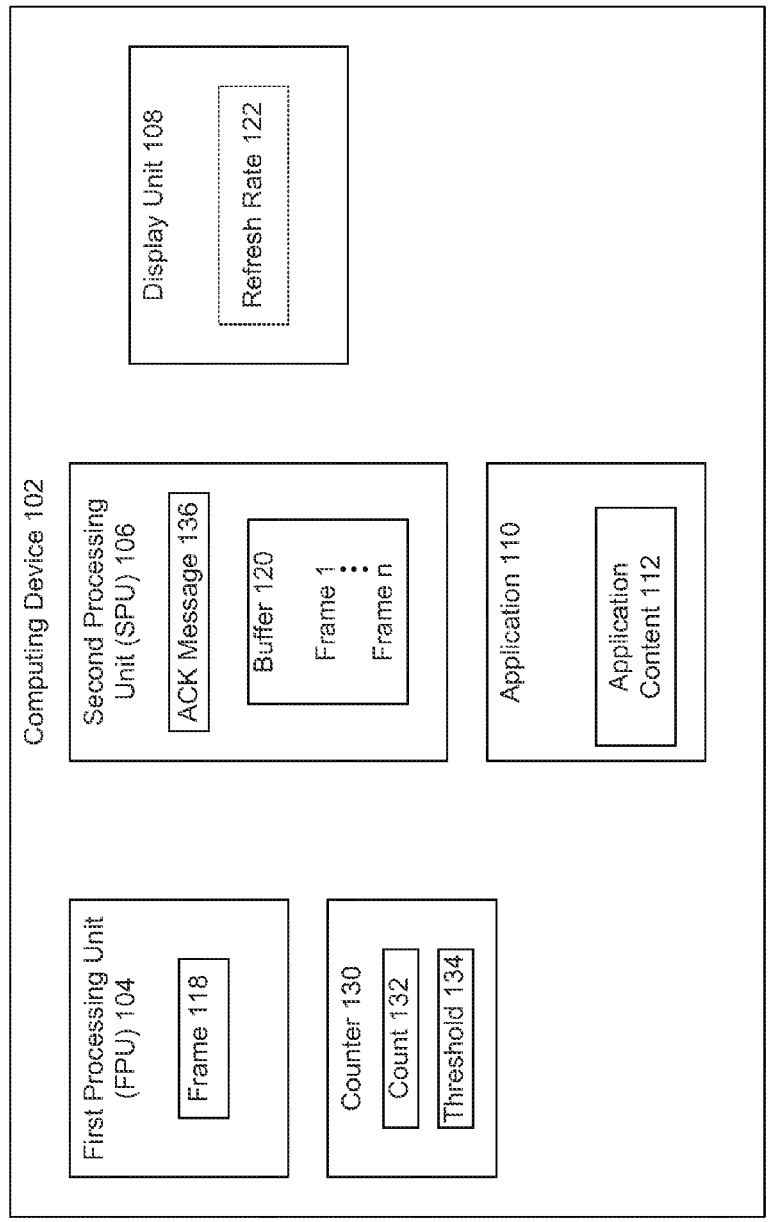
FIG. 1 is a diagram illustrating an example multi-processing system for rendering visual content, according to an embodiment.

FIG. 1 is a diagram illustrating a multi-processing system for rendering visual content, according to an embodiment. System 100 includes a computing device 102. The computing device 102 includes a first processing unit (FPU) 104, a second processing unit (SPU) 106, a display unit 108, and an application 110. In one embodiment. FPU 104 and SPU 106 may work together to render content or data from application 110 onto display unit 108 of computing device 102.

Computing device 102 may include any electronic computing device. For example, computing device 102 may be a computer, laptop, desktop, mobile phone, monitor, television, tablet computer, or other computing device. Computing device 102 may include one or more processors.

FPU 104 and SPU 106 may be processing units or processes of computing device 102. FPU 104 and SPU 106 may be general purpose or specialized processes. For example, SPU 106 may be a graphics processing unit (GPU) while FPU 104 is a general processing unit that renders application content 112 as frames 118. In one an embodiment, FPU 104 and SPU 106 may be individual threads or other processes operating on a central processing unit (CPU) or operating system of computing device 102. In another embodiment, FPU 104 and SPU 106 may be separate processors executing on computing device 102, which may include a multi-core processor or multiple processors.

In an example embodiment, FPU 104 and SPU 106 may processes, each operating on its own computing device 102. FPU 104 and SPU 106 (operating on separate computing devices 102) may then asynchronously communicate over any circuitry, wired or wireless connection enabling communication between the computing device 102. For example, the computing devices 102 by be coupled together or may otherwise communicate over any wired or wireless network, such as the Internet or a local intranet.

Though system 100 is described in reference to two processing units, one skilled in the art will recognize that computing device 102 may include additional processing units operable within system 100 and that the details described herein may include more than two processing units.

Display unit 108 may be a monitor or a screen upon which data is displayed on computing device 102. For example, display unit 108 may be an LCD (liquid crystal display), LED (light-emitting diode), plasma or other display unit. Computing device 102 may be either an integrated display unit 108, such the screen of a mobile phone, or a separate display unit 108, such as one or more monitors connected to a desktop computer. Other example embodiments may include wireless communications between display unit 108 and computing device 102.

Application 110 may include any application operating on computing device. Application 1110 may provide application content 112 to be displayed on display unit 108. Application 110 may receive or generate application content 112. For example, application 110 may be a browser connected to the Internet that receives application content 112 from one or more web servers over a network. In other embodiments, application 110 may be a video game application that generates application content 112, such as graphics, for display pertaining to the game being played, a word processing application that changes responsive to user input, or a multimedia playing application that receives content from a DVD or other multimedia file.

Though application 110 is shown as a separate unit, one skilled in the art understands that FPU 104 and SPU 106 may be processes operating within application 110. For example, application 110 may a graphics application that processes trusted and untrusted application content 110 (e.g., such as content downloaded from the Internet or another outside source). As such, for security reasons, application 110 may include FPU 104 that renders frames 118 from application content 112 (as discussed in greater detail below), and SPU 106 that renders frames 118 onto display unit 108. In such an embodiment, the processing described herein with regards to system 100 may be performed mostly or wholly within application 110. In other example embodiments, application 110 may be a separate application that communicates with FPU 104 and SPU 106.

Application content 112 may include any content from application 110 for rendering on display unit 108. Application content 112 may include electronic files or data such as digital images, text, scanned images or other multi-media content. In an embodiment, application content 112 may include an animation, a video, a slideshow or other sequence of frames or content that is to be rendered sequentially over a period of time. For example, application content 112 may include a five minute video clip from a website to be rendered on display unit 108, application content 112 including data for a sequence of steady-state frames that are to be rendered on display unit 108. Or, for example, application content 112 may include a video game, a cartoon, or a slideshow.

In another embodiment, application content 112 may include updated content for rendering on display unit 108, based on a determination that the currently displayed content is out-of-date or otherwise needs to be updated. For example, application 110 may detect the movement of a mouse or a cursor, and application content 112 may include new content that includes a visual indication of the new position of the mouse or cursor on display unit 108.

FPU 104 may render or generate frame 118 based on the received application content 112. Frame 118 may include a visual depiction or screen shot of application content 112 at a particular moment of time. Frame 118 may include color values for each pixel of display unit 108, and alpha channel values with transparency information for the pixels. In an embodiment, FPU 104 may render or generate frame 118 based on the dimensions or specifications of display unit 108. For example, the size and number of pixels and the colors used may be dependent on the capabilities of display unit 108.

Buffer 120 may include a portion of memory used to store frames 118. Buffer 120 may be, for example, a frame buffer used to store frame 118 data as provided by FPU 104. Buffer 120 may be any size buffer. In an embodiment, buffer 120 is big enough to store at least two frames 118. Though buffer 120 is shown, as residing on SPU 106, other embodiments may include buffer 120 as residing on FPU 104, or may include multiple buffers, one on each FPU 104 and SPU 106, or may include buffer 120 as residing as an independent unit or part of a third processing unit not shown).

SPU 106 may render a frame 118 onto display unit 108. SPU 106 may retrieve a frame 118 from buffer 120, process the frame 118 and render the corresponding visual content (e.g., application content 112) onto display unit 108. In an embodiment, SPU 106 may operate on either a video card or motherboard of computing device 102.

In one embodiment, SPU 106 may be a graphics processing unit (GPU), or other specialized process that application content 112 from frame 118 onto display unit 108, SPU 106 may call a swap-buffers function or send a swap buffers message to retrieve a frame 118 from buffer 120. If buffer 120 is a first-in, first-out (FIFO) buffer, then a swap-buffer function call may release the top-most frame 118 to SPU 106 for processing. SPU 106 may then render the content of frame 118 onto display unit 108.

Display unit 108 may include a refresh rate 122. Refresh rate 122 may be an al during which the screen of display unit 108 is refreshed with new data or a new frame 118. For example, refresh rate 122 may be the number of times per second that SPU 106 renders frame 118 onto display unit 108. During each refresh, SPU 106 may either re-render a currently rendered frame 118 on display unit 108 again (i.e., if no frames 118 are waiting in buffer 120) or retrieve a new frame 118 from buffer 120 to render.

In one embodiment, SPU 106 may request or retrieve a new frame 118 from buffer 120 based on refresh rate 122. For example, upon a refresh of display unit 108, SPU 106 may check buffer 120 to see if there are any frames 118 available for rendering. If buffer 120 includes at least one frame 118, then SPU 106 will retrieve the frame 118 and render it onto display unit 108. Otherwise, if buffer 120 is empty, SPU 106 may render the currently rendered frame 118 again, or do nothing.

In another embodiment, SPU 106 may retrieve frames 118 from buffer 120 based upon a determination that the currently rendered frame 118 needs to be updated. For example, application 110 may determine that the current frame 118 needs to be updated (e.g., based on a user action or other event occurrence), and may send a signal to SPU 106 to update the frame 118. In another example embodiment, user input, such as a mouse movement or keyboard stroke, may indicate that the current frame 118 is to be updated and cause SPU 106 to retrieve a frame 118 from buffer 120. SPU 106 may, for example, retrieve and render frames 118 from buffer 120 onto display unit 108 at a rate limited by refresh rate 122. Exceeding refresh rate 122 may cause a user operating computing device 102 not to see any frame 118 rendered on display unit 108 in between refreshes.

In conventional systems, a rendering processor generates frames and stores them on a buffer until the buffer is full. A graphics processor then retrieves the frames, one-at-a-time, and renders them on display unit 108 while blocking the rendering processor waits or is otherwise blocked from doing any additional processing until the buffer is empty. Once the buffer is empty, the rendering processor will begin generating additional frames and repeat the process. Such conventional systems often result in inconsistent frame rates and choppy images being rendered on a display unit. Further, such conventional systems waste resources by blocking a rendering processor from performing others actions until the buffer is empty.

System 100, by contrast, rate-limits how many frames 118 FPU 104 stores in buffer 120 and allows FPU 104 to perform other processing while buffer 120 is at its pre-determined capacity. System 100 uses a counter 130 to count or otherwise keep track of how many frames 118 are stored in buffer 120. Counter 130 maintains a count 132 of the number of flames 118 in buffer 120. Counter 130 increments count 132 each time FPU 104 generates a frame 118 that is stored in buffer 120, and decrements count 132 upon receipt of an acknowledge (ACK) message 136 from SPU 106 indicating that a frame 118 from buffer 120 has been retrieved and/or rendered on display unit 108. Once count 132 reaches a threshold 134, FPU 104 waits to render any additional frames 118 and is freed to perform other processing tasks.

Counter 130 counts how many outstanding frames 118 exist in buffer 120. As just referenced, counter 130 may be a simple counter that increments count 132 up to a threshold 134, and decrements count 132 down to zero. Count 132 is the number of outstanding frames 118 stored in buffer 120. Threshold 134 is the maximum number of frames that are to be held in buffer 120. In one embodiment, buffer 120 may have the capacity to hold a number of frames 118 greater than the number specified by threshold 134. However, when count 132 reaches threshold 134, FPU 104 may wait until count 132 drops below threshold 134 to continue rendering frames 118.

After threshold 134 is reached, FPU 104 may perform other processing tasks until count 132 drops below threshold 134. For example, FPU 104 may be a general processing unit that may render frames 118, but also perform other processing tasks on computing device 102. For example, such other processing tasks as may be include, for example, pre-processing application content 112 for rendering as a frame 118 or performing other functions unrelated to frame 118 rendering.

SPU 106 retrieves frame 118 from buffer 120, and renders the frame 118 on display unit 108. Upon retrieving frame 118 from buffer 120 or rendering frame 118 onto display unit 108, SPU 106 may transmit ACK message 136. ACK message 136 may be a confirmation or other indication that a frame 118 has been removed from buffer 120 and/or rendered on display unit 108. Counter 130 may receive ACK message 136, and decrement count 132 accordingly.

If upon decrementing count 132, count 132 is less than threshold 134, then FPU 104 may generate a new frame 118 from application content 112. This process may repeat so long as there is application content 112 available. In an embodiment, if count 132 is less than threshold 134, FPU 104 or counter 130 may request additional application content 112 from application 110. In another embodiment, application 110 may push application content 112 as it is ready, to be received by FPU 104. In another embodiment, FPU 104 may receive application content 112 from multiple applications 110.

In one embodiment, counter 130 may have a time-out period, after which if count 132 has not dropped below threshold 134 or otherwise been decremented, then FPU 104 may continue rendering frames 118. For example, after time-out period expires, it may be determined that ACK message 136 was never received but that a frame 118 was rendered. Then, for example, buffer 120 may be cleared and count 132 returned to zero, or count 132 may be decremented to account for a number of frames 118 that may be determined to have been processed during time-out period and FPU 104 may continue frame 118 rendering.

Threshold 134 may be set to a value that allows system 100 to operate in a smooth manner and provide a consistent frame rate by which SPU 106 may render frames 118 onto display unit 108 and that may coordinate with refresh rate 122 of display unit 108. For example, display unit 108 may have a refresh rate 122 of 60 hertz, in which case, setting threshold 134 to two may allow for a consistent frame rate to occur when rendering application content 112 on system 100. Other example embodiments may include display units 108 with divergent or variable refresh rates 122 and/or thresholds 134.

System 100 provides a reliable, repeatable system by which FPU 104 may be rate-limited, such that buffer 120 does not include too many, or too few frames 118 and that the processing resources of FPL 104 are not wasted. Once threshold 134 is reached, FPU 104 is free to perform other processing tasks while SPU 106 renders frames 118 from buffer 120 onto display unit 108. Once count 132, falls below threshold 134, FPU 104 may then continue rendering frames 118 rather than waiting until buffer 120 is empty to continue frame 118 rendering, thereby providing a reliable frame rate for system 100. Other example embodiments may include multiple thresholds 134. For example, there may be two thresholds 134, one indicating a maximum threshold for a number of frames 118 that may be stored in buffer 120 and one being the number of frames 118 remaining in buffer 120 at which point FPU 104 continues rendering frames 118. The result may be more consistent frame rates and smoother images rendered on display unit 108, and freeing up FPU 104 to perform additional processing, rather sitting idly waiting for buffer 120 to empty.

Figure 2:
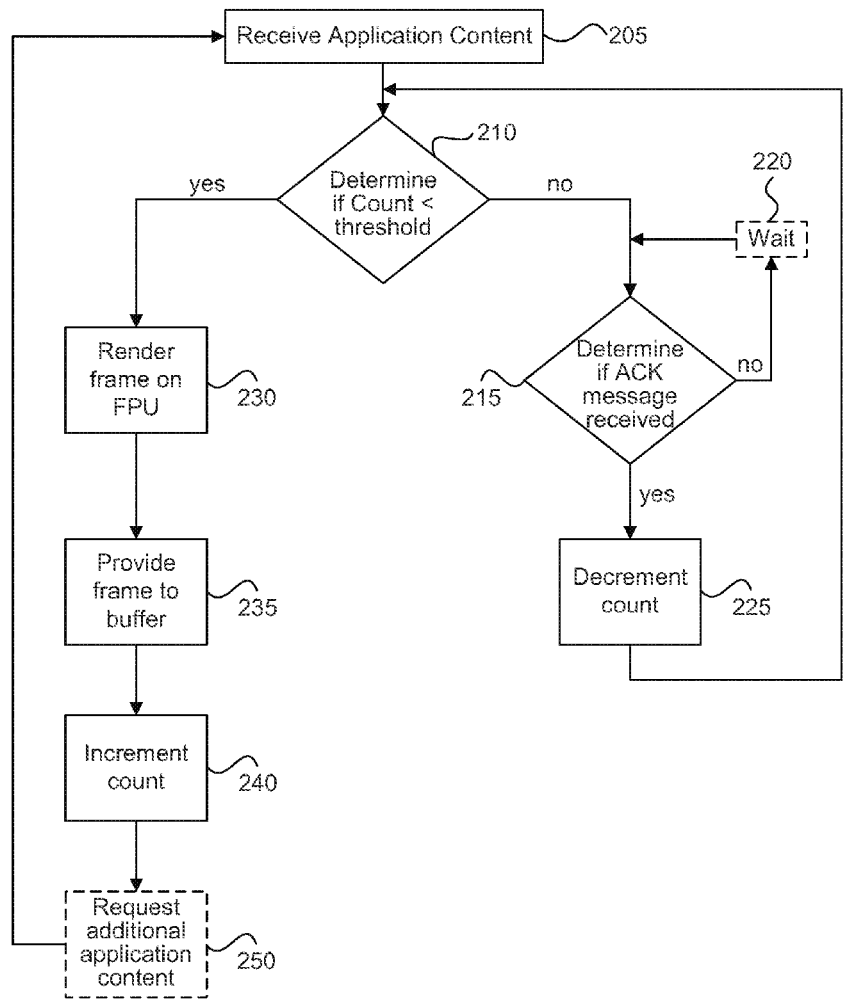
FIG. 2 is a flowchart of an example method for rendering visual content on a multi-processing system, according to an embodiment.

FIG. 2 is a flowchart of a method for rendering visual content on a multi-processing system, according to an embodiment.

At stage 205, application content is received. For example, FPU 104 may receive application content 112 from application 110. Application content 112 may include any data from application 110 to be rendered on display unit 108. Application content 112 may include, for example, an animation or other steady-stream data or video content for a sequence of frames.

At stage 210, a determination is made as to whether count is less than threshold. For example counter 130 may determine whether count 132 is less than threshold 134. Counter 130 may increment count 132 each time FPU 104 renders a frame 118 and provides that frame 118 to SPU 106, and may decrement count 132 each time SPU 106 returns an ACK message 136 indicating that an outstanding frame 118 has been processed displayed on display unit 108). When additional application content 112 is received, counter 130 checks count 132 to see if count 132 is less than threshold 134. Threshold 134 is the maximum number of outstanding flames 118 that may be stored in buffer 120, waiting to be processed by SPU 106.

At stage 215, if the count is greater than or equal to the threshold, a determination is made as to whether an ACK message has been received. For example, SPU 106 may return ACK message 136 each time a frame 118 from buffer 120 is processed and rendered on display unit 108. Counter 130 may track the generation or receipt of ACK messages 136 from SPU 106. In another embodiment, another unit (not shown) may generate or transmit ACK message 136 after a frame 118 is retrieved from buffer 120 and/or the frame 118 is rendered onto display unit 108.

At stage 220, if no ACK message has been received, then the FPU waits until a message is received. As referenced above, counter 130 decrements count 132 each time an ACK message 136 is received. During this wait period 220, FPU 104 may perform other processes that may be waiting to be performed on computing device 102. In another embodiment, counter 130 may have a time-out period, which may indicate a maximum wait time during which to wait for the receipt of an ACK message 136. If upon the expiration of the time-out period no ACK message 136 has been received, or if an ACK message 136 is received prior to the expiration of the time-out period, processing may continue at stage 215. If at stage 215, the time-out period had expired without receipt of an ACK message 136, processing may continue to stage 225. Otherwise, if the no ACK message 136 has been received and the time-out period has not expired, processing may continue to wait at stage 220.

At stage 225, the count is decremented. For example, counter 130 may decrement count 132 upon receipt or detection of ACK message 136 from SPU 106. In another embodiment as referenced above, count 132 may be decremented at stage 225 at the expiration of a time-out period of no ACK message 136 is received. After count 132 is decremented, processing returns to stage 210 where count 132 is compared against threshold 134.

At stage 230, a frame is rendered on the FPU. For example, FPU 104 may render frame 118 from application content 112 received from application 110. In one embodiment, FPU 104 may store application content 112 to be rendered locally until count 132 is less than threshold 134, or FPU 104 may receive or request application content 112 from application 110 after count 130 is less than threshold 134.

At stage 240, the frame is provided to a buffer. For example, FPU 104 may render frame 118, which is stored in buffer 120. Frames 118, as stored in buffer 120, may then be available to SPU 106 for rendering on display unit 108. For example, SPU 106 may sequentially render frames 118 as stored in buffer 120 in a first-in, first-out (FIFO) manner.

At stage 240, the count is incremented. For example, after frame 118 is generated by FPU 104 and/or stored in buffer 120, counter 130 may increment count 132. Count 132 may track how many frames 118 are stored in buffer 120, or are otherwise waiting to be rendered on display unit 108 by SPU 106.

At stage 250, additional video content may be requested. For example, if count 132 is less than threshold 134, then FPU 104 may request additional application content 112 from application 110 is application 110 has not already pushed or otherwise made available addition application content 112. If there is no additional application content 112 at that time, FPU 104 may perform other processing and wait until additional application content 112 is received. When additional application content 112 is received, processing may continue at stage 205.

Figure 3:
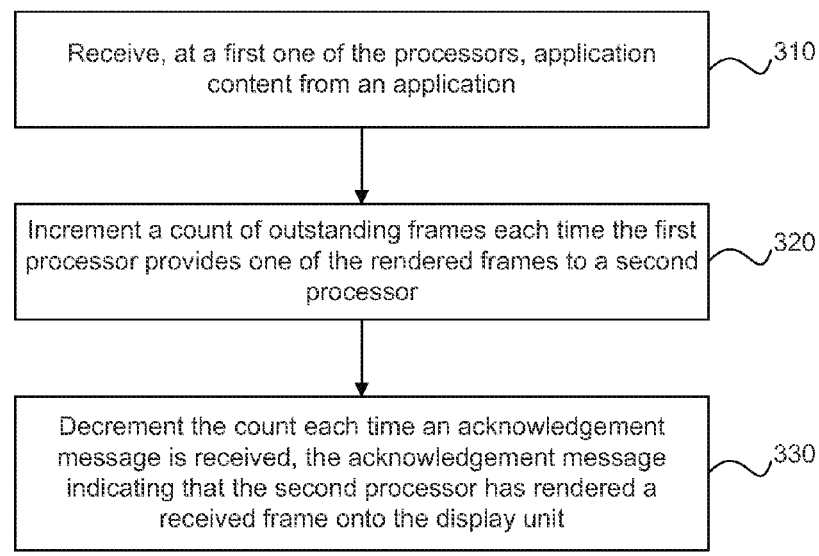
FIG. 3 is another flowchart of an example method for rendering visual content on a multi-processing system, according to an embodiment.

FIG. 3 is a flowchart of a method for rendering visual content on a multi-processing system, according to an embodiment.

At stage 310, visual content is received from an application on a first processor. For example, FPU 104 may receive application content 112 from application 110. FPU 104 may then generate frame 118 corresponding to application content 112.

In one embodiment, prior to rendering frame 118, FPU 104 may check to see that count 132 is less than threshold 134. If count 130 is less than threshold 134, then FPU 104 may generate frame 118, otherwise FPU 104 may wait to generate frame 118 (i.e., until count 132 is less than threshold 134).

At stage 320, a count of outstanding frames is incremented each time the first processor provides one of the rendered frames to a second processor. For example, each time FPU 104 provides a frame 118 to SPU 106, or stores frame 118 in buffer 120, counter 130 may increment count 132 by one.

At stage 330, a count of outstanding frames is decremented each time an acknowledgement message is received, the acknowledgement message indicating that the second processor has rendered a received frame onto the display unit. For example, each time SPU 106 makes a swap-buffers call, or otherwise retrieves frame 118 from buffer 120, SPU 106 may transmit ACK message 136. Upon receiving ACK message 136 at FPU 104 or counter 130, counter 130 may decrement count 132 by one. If count 132 is below threshold 134 after the decrement, then FPU 104 may generate a new frame 118 for buffer 120.

Figure 4:
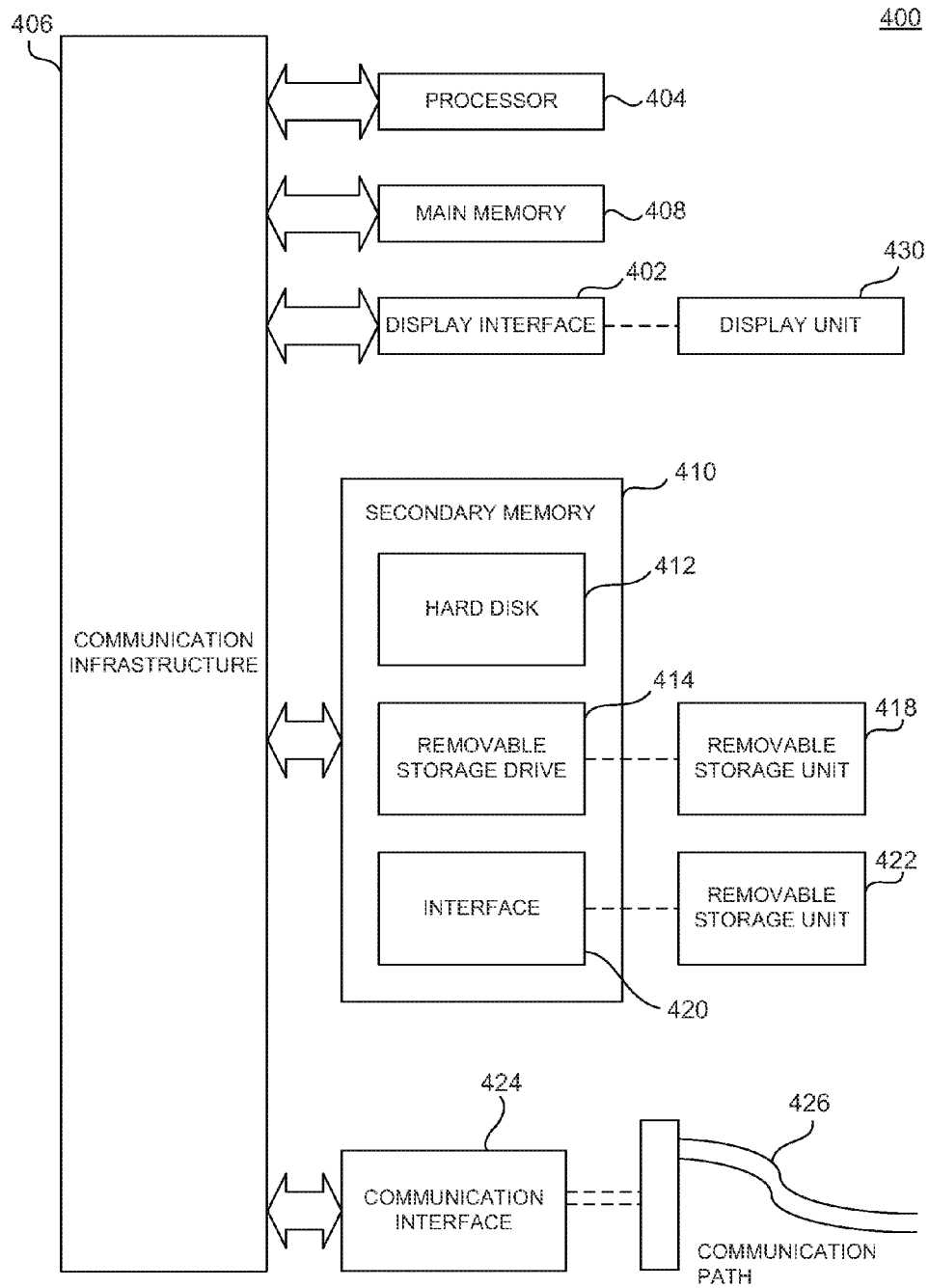
FIG. 4 is a diagram of an exemplary computer system embodiment.

FIG. 4 illustrates an example computer system 400 in which embodiments of as described herein, or portions thereof, may be implemented as computer-readable code. For example, system 100 may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-3.

If programmable logic is used, such logic may execute on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments are described in terms of this example computer system 400. After reading this description, it will become apparent to a person skilled in the relevant art how to implement the embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 404 may be a special purpose or a general-purpose processor device. As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412, removable storage drive 414. Removable storage drive 414 may comprise a floppy disk drive, a magnetic tape drive, an optical disk drive, a flash memory, or the like. The removable storage drive 414 reads from and/or writes to a removable storage unit 418 in a well-known manner. Removable storage unit 418 may comprise a floppy disk, magnetic tape, optical disk, etc. which is read by and written to by removable storage drive 414. As will be appreciated by persons skilled in the relevant art, removable storage unit 418 includes a computer usable storage medium having stored therein computer software and/or data.

In alternative embodiments, secondary memory 410 may include other similar means for allowing computer programs or other instructions to be loaded into computer system 400.

Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 426 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 418, removable storage unit 422, and a hard disk installed in hard disk drive 412. Computer program medium and computer usable medium may also refer to memories, such as main memory 408 and secondary memory 410, which may be memory semiconductors (e.g. DRAMs, etc.).

Computer programs (also called computer control logic) are stored in main memory 408 and/or secondary memory 410. Computer programs may also be received via communications interface 424. Such computer programs, when executed, enable computer system 400 to implement the present embodiments as discussed herein, in particular, the computer programs, when executed, enable processor device 404 to implement the processes as illustrated by the flowcharts of FIGS. 3 and 4 discussed above. Accordingly, such computer programs represent controllers of the computer system 400. Where an embodiment is implemented using software, the software may be stored in a computer program product and loaded into computer system 400 using removable storage drive 414, interface 420, and hard disk drive 412, or communications interface 424.

Embodiments may also be directed to computer program products comprising software stored on any computer useable medium. Such software, when executed in one or more data processing device, causes a data processing device(s) to operate as described herein. Embodiments may employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

The embodiments have been described above with the aid of functional building blocks illustrating the embodiment of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments allows others, by applying knowledge within the skill of the art, readily modify and/or adapt for various applications such specific embodiments, without undue experimentation, without departing from the general concept of what has been described herein. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system comprising:
a content receiver configured to receive application content for rendering on a display unit of a computing device;
a first processing unit, executing a plurality of processes, including at least one of the processes being configured to fender the application content onto a plurality of frames;
a second processing unit configured to sequentially render the plurality of frames onto the display unit, wherein the first processing unit is configured to provide the plurality of frames to the second processing unit; and
a counter including a count of a number of outstanding frames as provided by the first processing unit to the second processing unit, wherein the number of outstanding frames includes how many frames, of the plurality of frames, the first processing unit provides to the second processing unit for which a corresponding acknowledgement message indicating that one of the outstanding frames has been rendered onto the display unit has not been received by the counter,
wherein the counter is configured to determine when the first processing unit renders the application content onto a first frame of the plurality of frames,
wherein if the count is less than a threshold, the first processing unit renders the application content onto the first frame upon receipt of the application content by the content receiver, and
wherein if the count is greater than or equal to the threshold, the first processing unit waits to render the application content onto the first frame until the counter decrements the count upon a receipt of the corresponding acknowledgement message for one of the outstanding frames and the count is less than the threshold.

2. The system of claim 1, comprising:
an application configured to provide the application content to the content receiver.

3. The system of claim 2, wherein the application comprises an application content processing application configured to render the application content as received from entrusted sources of information, and wherein the first processing unit and the second processing unit are configured to run the application content processing application on separate threads on the computing device.

4. The system of claim 2, wherein the application content includes steady-state application content,
wherein the application is configured to provide a portion of the steady-state application content over each of a plurality of time intervals, and
wherein first processing unit is configured to render each portion onto one of the plurality of frames.

5. The system of claim 1, wherein the second processing unit is configured to provide an acknowledgement message corresponding to one of the outstanding frames based upon a rendering of respective outstanding frame onto the display unit.

6. The system of claim 1, wherein the content receiver requests additional application content for rendering on the display, wherein the first processing unit is configured to render the additional application content onto a second frame of the plurality of frames.

7. The system of claim 6, wherein the content receiver requests the additional application content based upon a determination that the count is less than the threshold.

8. The system of claim 1, wherein the first processing unit and the second processing unit operate on a single processor of the computing device.

9. The system of claim 1, wherein the first processing unit and the second processing unit operate on separate processors of the computing device.

10. The system of claim 1, wherein the second processing unit includes a buffer configured to store the outstanding frames as received from the first processing unit until they are rendered onto the display unit.

11. The system of claim 1, wherein the rendering of the plurality of frames by the first processing unit is performed asynchronously with regards to the rendering of the plurality of frames by the second processing unit.

12. The system of claim 11, wherein the threshold is set to two.

13. The system of claim 1, wherein the display unit is configured with a refresh rate, and wherein the threshold is set based on the refresh rate.

14. The system of claim 1, wherein the second processing unit is a graphical processing unit (GPU).

15. The system of claim 1, wherein the first processing unit operates on a first computing device independent of a second computing device upon which the second processing unit operates.

16. In at least one computer having at least one processor and one memory, a computer-implemented method, performed by the at least one processor, for rendering application content onto a display unit, the computer-implemented method comprising:
    receiving the application content for rendering on the display unit;
    determining if a count of outstanding frames as provided by a first processing unit to a second processing unit is less than a threshold, wherein the outstanding frames comprise frames of the application content generated provided by the first processing unit to the second processing unit for which an acknowledgement message has not been received by a counter maintaining the count;
    if the count is not less than the threshold:
        waiting until the acknowledgement message for one or more of the outstanding frames is received, and determining the count for each received acknowledgement message until the count is less than the threshold; and
    if count is less than the threshold,
        rendering a frame of the application content on the first processing unit,
        providing the rendered frame to the second processing unit for rendering on the display unit, and
        incrementing the count.

17. The computer-implemented method of claim 16, wherein if the count is less than the threshold further comprises requesting additional application content.

18. The computer-implemented method of claim 17, wherein the acknowledgement message is sent by the second processing unit upon a rendering of one of the outstanding frames onto the display unit.

19. The computer-implemented method of claim 16, wherein the acknowledgement message is received at the first processing unit.

20. The computer-implemented method of claim 16, wherein the waiting comprises:
    determining that the first processing unit is configured to perform one or more tasks in addition to the rendering the frame of the application content; and
    performing, by first processing unit, the one or more tasks until the acknowledgement message for one or more of the outstanding frames is received and the count is less than the threshold.

21. A computer program product implemented on one or more processors and a tangible memory accessible to the one or more processors, the memory comprising code for rendering application content onto a display unit that when executed cause the one or more processors to:
    receive, at a first one of the processors, application content from an application, wherein the first processor is configured to render the application content onto a plurality of frames associated with the application, including rendering a portion of the application content onto a first frame of the plurality of frames,
    increment a count of outstanding frames, by a counter, each time the first processor provides one of the rendered frames to a second processor, wherein the second processor is configured to render the received frames onto the display unit;
    decrement the count each time an acknowledgement message is received by the counter, the acknowledgement message indicating that the second processor has rendered a received frame onto the display unit;
    wherein, the first processor does not render the portion of the application content onto the first frame while the count is greater than a threshold.

22. The computer program product of claim 21, wherein the memory comprises code that when executed cause the one or more processors to:
    determine the threshold based on a refresh rate of the display unit; and
    request the application content from the application based on a determination the count has been decremented below the threshold.

* * * * *

UNITED STATES PATENT AND TRADEMARK OFFICE
CERTIFICATE OF CORRECTION

| | | |
|---|---|---|
| PATENT NO. | : 8,493,399 B1 | Page 1 of 1 |
| APPLICATION NO. | : 13/347528 | |
| DATED | : July 23, 2013 | |
| INVENTOR(S) | : Duca et al. | |

It is certified that error appears in the above-identified patent and that said Letters Patent is hereby corrected as shown below:

Title page
Items (12) and (75), please list Nathaniel Duca as first inventor and John Paul Bates as second inventor.

In the Claims

Column 10, Claim 3,
Line 57, please replace "entrusted sources of information" with --untrusted sources of information--.

Column 11, Claim 16,
Line 57, please replace "determining the count" with --decrementing the count--.

Signed and Sealed this
Nineteenth Day of November, 2013

Teresa Stanek Rea
*Deputy Director of the United States Patent and Trademark Office*